(12) United States Patent
Messmer (10) Patent No.: US 9,304,831 B2
(45) Date of Patent: Apr. 5, 2016

(54) SCHEDULING EXECUTION CONTEXTS WITH CRITICAL REGIONS

(75) Inventor: William R. Messmer, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1396 days.

(21) Appl. No.: 12/240,319

(22) Filed: Sep. 29, 2008

(65) Prior Publication Data

US 2010/0083258 A1    Apr. 1, 2010

(51) Int. Cl.
| G06F 9/455 | (2006.01) |
| G06F 9/46  | (2006.01) |
| G06F 9/52  | (2006.01) |
| G06F 9/50  | (2006.01) |

(52) U.S. Cl.
CPC .............. *G06F 9/526* (2013.01); *G06F 9/5077* (2013.01)

(58) Field of Classification Search
USPC ...................................................... 718/1, 102
See application file for complete search history.

(56) References Cited

U.S. PATENT DOCUMENTS

| 5,414,848 | A  |   | 5/1995  | Sandage et al.         |
| 5,911,065 | A  |   | 6/1999  | Williams et al.        |
| 6,052,707 | A  |   | 4/2000  | D'Souza                |
| 6,167,423 | A  | * | 12/2000 | Chopra et al. ........ 718/100 |
| 6,625,635 | B1 |   | 9/2003  | Elnozahy               |
| 6,795,901 | B1 | * | 9/2004  | Florek et al. ........ 711/152 |
| 6,904,595 | B2 |   | 6/2005  | Alford et al.          |
| 6,934,950 | B1 | * | 8/2005  | Tuel et al. ......... 718/102 |
| 7,117,481 | B1 | * | 10/2006 | Agesen et al. ........ 717/120 |
| 7,159,220 | B2 | * | 1/2007  | Buch ................. 718/104 |
| 7,178,062 | B1 | * | 2/2007  | Dice ................ 714/38.13 |
| 7,296,271 | B1 |   | 11/2007 | Chalmer et al.         |
| 2008/0077382 | A1 |   | 3/2008  | Strehl               |

OTHER PUBLICATIONS

Boussinot, Frederic, "FairThreads: Mixing Cooperative and Preemptive Threads in C", Retrieved at <<ftp://ftp.inria.fr/INRIA/publication/publi-ps-gz/RR/RR-5039.ps.gz>>, Published by INRIA, Dec. 2003, pp. 31.
Layland-Thorvald, et al., "Real-Time Operating Systems, continued & basic Scheduling Theory", Retrieved at <<http://www.md.kth.se/RTC/RTCC/Material01/Lectures/Day-three-RTOS.pdf>>, Feb. 13, 2002, Slides 1-71.
Dabrowski et al., "Cooperative Threads and Preemptive Computations", Retrieved at <<http://hal.archives-ouvertes.fr/docs/00/07/87/80/PDF/article.pdf>>, pp. 15.

* cited by examiner

*Primary Examiner* — Corey S Faherty
(74) *Attorney, Agent, or Firm* — Kevin Sullivan; Aaron Hoff; Micky Minhas (57) ABSTRACT

A scheduler in a process of a computer system detects an execution context that blocked from outside of the scheduler while in a critical region. The scheduler ensures that the execution context resumes execution on the processing resource of the scheduler on which the execution context blocked when the execution context becomes unblocked. The scheduler also prevents another execution context from entering a critical region on the processing resource prior to the blocked execution context becoming unblocked and exiting the critical region.

20 Claims, 4 Drawing Sheets

SCHEDULING EXECUTION CONTEXTS WITH CRITICAL REGIONS

BACKGROUND

Processes executed in a computer system may include execution context schedulers that schedule tasks of processes for execution in the computer system. A scheduler may create execution contexts (e.g., threads, fibers, or child processes) in order to execute tasks. During execution, the scheduler maintains control over these execution contexts and maintains control of the processing resources allocated to the scheduler.

At times, an execution context may be blocked by an entity other than the scheduler while executing on a processing resource of the scheduler. If the scheduler is not notified of the block, the processing resource that was executing the block execution context may become idle. In addition, the scheduler may undesirably attempt to schedule the execution context on a different processing resource when the execution context becomes unblocked.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A scheduler in a process of a computer system detects an execution context that blocked from outside of the scheduler while in a critical region. The scheduler ensures that the execution context resumes execution on the processing resource of the scheduler on which the execution context blocked when the execution context becomes unblocked. The scheduler also prevents another execution context from entering a critical region on the processing resource prior to the blocked execution context becoming unblocked and exiting the critical region.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown, by way of illustration, specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
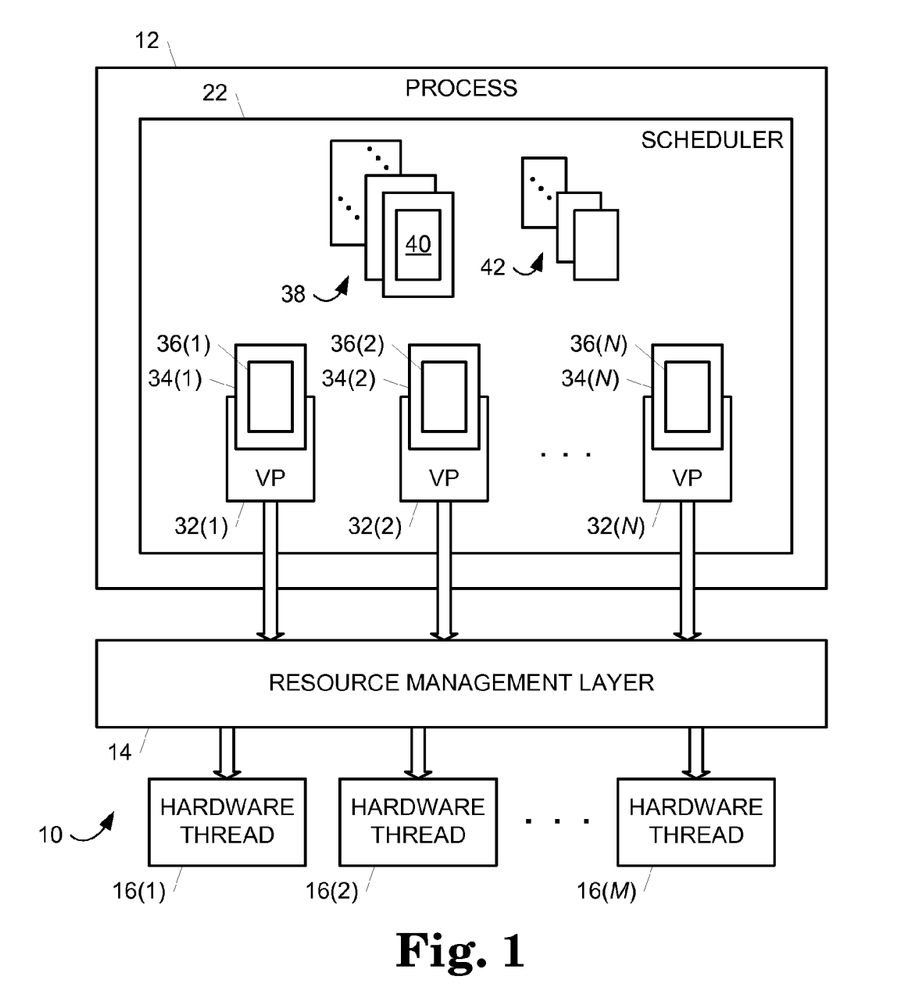
FIG. 1 is a block diagram illustrating an embodiment of a scheduler configured to schedule execution contexts for execution by processing resources.

FIG. 1 is a block diagram illustrating an embodiment of a scheduler 22 in a process 12 of a runtime environment 10. Scheduler 22 is configured to schedule execution contexts for execution by processing resources.

Runtime environment 10 represents a runtime mode of operation in a computer system, such as a computer system 100 shown in FIG. 5 and described in additional detail below, where the computer system is executing instructions. The computer system generates runtime environment 10 from a runtime platform such as a runtime platform 122 shown in FIG. 5 and described in additional detail below.

Runtime environment 10 includes an least one invoked process 12, a resource management layer 14, and a set of hardware threads 16(1)-16(M), where M is an integer that is greater than or equal to one and denotes the Mth hardware thread 16(M). Runtime environment 10 allows tasks from process 12 to be executed, along with tasks from any other processes that co-exist with process 12 (not shown), using an operating system (OS) such as an OS 120 shown in FIG. 5 and described in additional detail below, resource management layer 14, and hardware threads 16(1)-16(M). Runtime environment 10 operates in conjunction with the OS and/or resource management layer 14 to allow process 12 to obtain processor and other resources of the computer system (e.g., hardware threads 16(1)-16(M)).

Runtime environment 10 includes a scheduler function that generates scheduler 22. In one embodiment, the scheduler function is implemented as a scheduler application programming interface (API). In other embodiments, the scheduler function may be implemented using other suitable programming constructs. When invoked, the scheduler function creates scheduler 22 in process 12 where scheduler 22 operates to schedule tasks of process 12 for execution by one or more hardware threads 16(1)-16(M). Runtime environment 10 may exploit fine grained concurrency that application or library developers express in their programs (e.g., process 12) using accompanying tools that are aware of the facilities that the scheduler function provides.

Process 12 includes an allocation of processing and other resources that hosts one or more execution contexts (viz., threads). Process 12 obtains access to the processing and other resources in the computer system (e.g., hardware threads 16(1)-16(M)) from the OS and/or resource management layer 14. Process 12 causes tasks to be executed using the processing and other resources.

Process 12 generates work in tasks of variable length where each task is associated with an execution context in scheduler 22. Each task includes a sequence of instructions that perform a unit of work when executed by the computer system. Each execution context forms a thread that executes associated tasks on allocated processing resources. Each execution context includes program state and machine state information. Execution contexts may terminate when there are no more tasks left to execute. For each task, runtime environment 10 and/or process 12 either assign the task to scheduler 22 to be scheduled for execution or otherwise cause the task to be executed without using scheduler 22.

Process 12 may be configured to operate in a computer system based on any suitable execution model, such as a stack model or an interpreter model, and may represent any suitable type of code, such as an application, a library function, or an operating system service. Process 12 has a program state and machine state associated with a set of allocated resources that include a defined memory address space. Process 12 executes autonomously or substantially autonomously from any co-existing processes in runtime environment 10. Accordingly, process 12 does not adversely alter the program state of co-existing processes or the machine state of any resources allocated to co-existing processes. Similarly, co-existing processes do not adversely alter the program state of process 12 or the machine state of any resources allocated to process 12.

Resource management layer 14 allocates processing resources to process 12 by assigning one or more hardware threads 16 to process 12. Resource management layer 14 exists separately from the OS in the embodiment of FIG. 1. In other embodiments, resource management layer 14 or some or all of the functions thereof may be included in the OS.

Hardware threads 16 reside in execution cores of a set or one or more processor packages (e.g., processor packages 102 shown in FIG. 5 and described in additional detail below) of the computer system. Each hardware thread 16 is configured to execute instructions independently or substantially independently from the other execution cores and includes a machine state. Hardware threads 16 may be included in a single processor package or may be distributed across multiple processor packages. Each execution core in a processor package may include one or more hardware threads 16.

Process 12 implicitly or explicitly causes scheduler 22 to be created via the scheduler function provided by runtime environment 10. Scheduler instance 22 may be implicitly created when process 12 uses APIs available in the computer system or programming language features. In response to the API or programming language features, runtime environment 10 creates scheduler 22 with a default policy. To explicitly create a scheduler 22, process 12 may invoke the scheduler function provided by runtime environment 10 and specify one or more policies for scheduler 22.

Scheduler 22 interacts with resource management layer 14 to negotiate processing and other resources of the computer system in a manner that is transparent to process 12. Resource management layer 14 allocates hardware threads 16 to scheduler 22 based on supply and demand and any policies of scheduler 22.

In the embodiment shown in FIG. 1, scheduler 22 manages the processing resources by creating virtual processors 32 that form an abstraction of underlying hardware threads 16. Scheduler 22 includes a set of virtual processors 32(1)-32(N) where N is an integer greater than or equal to one and denotes the Nth virtual processor 32(N). Scheduler 22 multiplexes virtual processors 32 onto hardware threads 16 by mapping each virtual processor 32 to a hardware thread 16. Scheduler 22 may map more than one virtual processor 32 onto a particular hardware thread 16 but maps only one hardware thread 16 to each virtual processor 32. In other embodiments, scheduler 22 manages processing resources in other suitable ways to cause instructions of process 12 to be executed by hardware threads 16.

The set of execution contexts in scheduler 22 includes a set of execution contexts 34(1)-34(N) with respective, associated tasks 36(1)-36(N) that are being executed by respective virtual processors 32(1)-32(N) and, at any point during the execution of process 12, a set of zero or more execution contexts 38. Each execution context 34 and 38 includes state information that indicates whether an execution context 34 or 38 is executing, runnable (e.g., in response to becoming unblocked or added to scheduler 22), or blocked. Execution contexts 34 that are executing have been attached to a virtual processor 32 and are currently executing. Execution contexts 38 that are runnable include an associated task 40 and are ready to be executed by an available virtual processor 32. Execution contexts 38 that are blocked also include an associated task 40 and are waiting for data, a message, or an event that is being generated by another execution context 34 or will be generated by another execution context 38.

Each execution context 34 executing on a virtual processor 32 may generate, in the course of its execution, additional tasks 42, which are organized in any suitable way (e.g., added to work queues (not shown in FIG. 1)). Work may be created by using either application programming interfaces (APIs) provided by runtime environment 10 or programming language features and corresponding tools in one embodiment. When processing resources are available to scheduler 22, tasks are assigned to execution contexts 34 or 38 that execute them to completion on virtual processors 32 before picking up new tasks. An execution context 34 executing on a virtual processor 32 may also unblock other execution contexts 38 by generating data, a message, or an event that will be used by other execution contexts 38.

Figure 4:
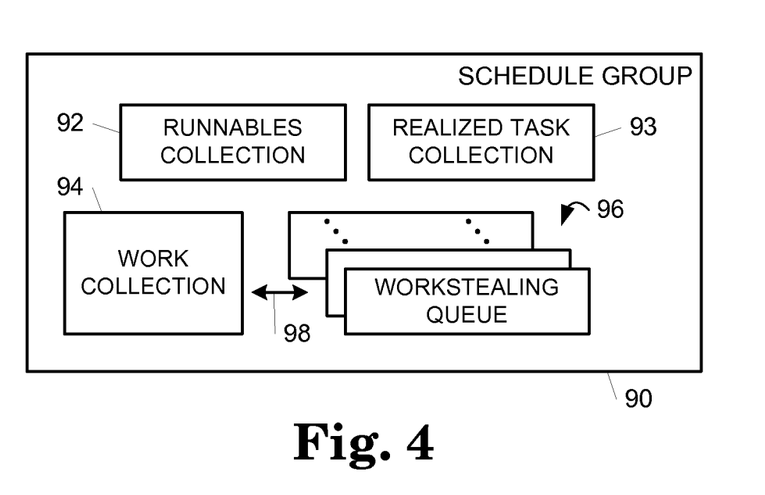
FIG. 4 is a block diagram illustrating an embodiment of a scheduling group for use in a scheduler.

Each task in scheduler 22 may be realized (e.g., realized tasks 36 and 40), which indicates that an execution context 34 or 38 has been or will be attached to the task and the task is ready to execute. Realized tasks typically include unblocked execution contexts and scheduled agents. A task that is not realized is termed unrealized. Unrealized tasks (e.g., tasks 42) may be created as child tasks generated by the execution of parent tasks and may be generated by parallel constructs (e.g., parallel or parallel for). Scheduler 22 may be organized into a synchronized collection (e.g., a stack and/or a queue) for logically independent tasks with execution contexts (i.e., realized tasks) along with a list of workstealing queues for dependent tasks (i.e., unrealized tasks) as illustrated in the embodiment of FIG. 4 described below.

Prior to executing tasks, scheduler 22 obtains execution contexts 34 and 38 from runtime environment 10 or the operating system. Available virtual processors 32 locate and execute execution contexts 34 to begin executing tasks. Virtual processors 32 become available again in response to an execution context 34 completing, blocking, or otherwise being interrupted (e.g., explicit yielding or forced preemption). When virtual processors 32 become available, the available virtual processor 32 may switch to a runnable execution context 38 to execute an associated task 40. The available virtual processor 32 may also execute a next task 40 or 42 as a continuation on a current execution context 34 if the previous task 36 executed by the current execution context 34 completed.

Scheduler 22 searches for a runnable execution context 38 or an unrealized task 42 to attach to the available virtual processor 32 for execution in any suitable way. For example, scheduler 22 may search for a runnable execution context 38 to execute before searching for an unrealized task 42 to execute. Scheduler 22 continues attaching execution contexts 38 to available virtual processors 32 for execution until all tasks and execution contexts 38 of scheduler 22 have been executed.

At times, an execution context 34 may be blocked by an entity other than scheduler 22. The entity may be the OS or a runtime platform, such as a runtime platform 122 shown in FIG. 5 and described in additional detail below, and may preempt an execution context 34 without notifying scheduler 22. Such preemption may occur, for example, if execution context 34 performs a memory access that triggers a page fault in a system where the OS supports demand-paged virtual memory. If an execution context 34 page faults in such a system, the OS may preempt and block the execution context 34 and service the page fault as a hard fault that requires input/output (I/O) to a device, such as a hard disk drive in memory system.

In some circumstances, an execution context 34 that is blocked from outside of scheduler 22 may simply be rescheduled by scheduler 22 when scheduler 22 detects that the execution context 34 has become unblocked. Scheduler 22 may rescheduled the execution context 34 by attaching the execution context 34 to a virtual processor 32 that may or may not be the same virtual processor 32 that was executing the execution context 34 when the execution context 34 was blocked.

In other circumstances, however, an execution context 34 that is blocked from outside of scheduler 22 may be accessing data corresponding to a particular processing resource. For example, the execution context 34 may hold locks or other synchronization mechanisms (e.g., scheduling locks) or may be otherwise accessing data corresponding to a particular processing resource when the execution context 34 is blocked. As a result, a subsequent execution context 34 that is scheduled on the virtual processor 32 that was executing the blocked execution context 34 may not be able to execute because of the locks held by the blocked execution context 34. In addition, data accessed by the blocked execution context 34 may have relevance only on the virtual processor 32 that was executing the blocked execution context 34. As a result, the execution of the blocked execution context 34 may become confused if scheduler 22 reschedules the blocked execution context 34 on another virtual processor 32 when the execution context 34 becomes unblocked.

Scheduler 22 operates to detect each execution context 34 that is blocked from outside of scheduler 22 while in a critical region 50 (e.g., critical region 50A in FIG. 2A) of the execution context 34. A critical region 50 is a set of instructions in an execution context 34 whose execution becomes contingent on data corresponding to a particular processing resource, e.g., a particular virtual processor 32. When scheduler 22 detects such an execution context 34, scheduler 22 ensures that the execution context 34 resumes execution on the processing resource, e.g., the virtual processor 32, on which the execution context 34 blocked when the execution context 34 becomes unblocked. Scheduler also prevents another execution context 34 or 38 from entering a critical region 50 on the same processing resource, e.g., the same virtual processor 32, prior to the blocked execution context 34 becoming unblocked and exiting the critical region 50.

In one embodiment, a critical region 50 may encompass code that is responsible for making a scheduling decision for a virtual processor 32. The scheduling decision may involve identifying an execution context 38 with accompanying task or a task 42 to be picked up for execution by the virtual processor 32. In making the scheduling decision, the code in the critical region 50 may take locks or initiate other synchronization mechanisms that are local to the virtual processor 32. In other embodiments, a critical region 50 may encompass code that performs other functions where it is desirable to ensure that the code, if blocked from outside of scheduler 22, resumes on the same virtual processor 32.

Figure 2A:
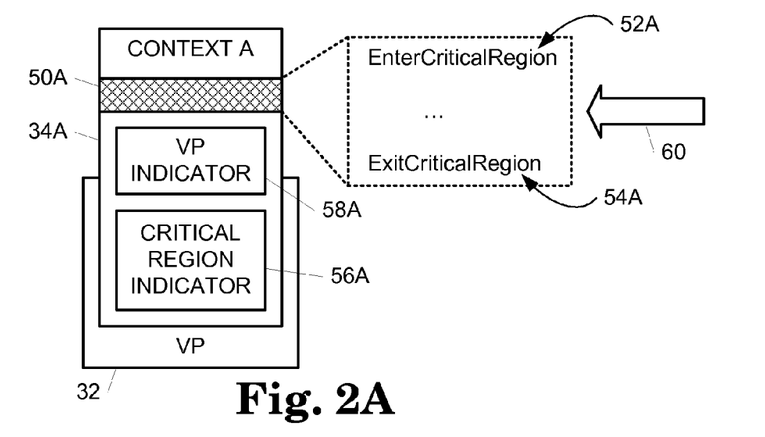
FIGS. 2A-2C are block diagrams illustrating embodiments of a processing resource that executes execution contexts.

FIG. 2A is a block diagram illustrating an embodiment of a processing resource, i.e., virtual processor 32, executing an execution context 34A. Execution context 34A includes a critical region 50A which, in the embodiment of FIG. 2A, is defined by programming constructs 52A (EnterCriticalRegion) and 54A (ExitCriticalRegion). In one embodiment, constructs 52A and 54A are implemented as APIs to functions in resource management layer 14, the OS, and/or the runtime platform. In other embodiments, constructs 52A and 54A may be implemented using other suitable type and/or number of explicit programming constructs. In other embodiments, critical regions 50 may be defined implicitly by including selected types of instructions or other constructs that, by definition, cause a portion of an execution context 34 to be a critical region 50.

When an execution context 34 enters or otherwise begins execution of a critical region 50, the execution context 34 sets a critical region indicator 56 (e.g., critical region indicator 56A in FIG. 2A) corresponding to the execution context 34. The execution context 34 clears the critical region indicator 56 when the execution context 34 exits or otherwise finishes execution of the critical region 50. In addition, an execution context 34 stores a virtual processor indicator 58 (e.g., virtual processor indicator 58A in FIG. 2A) that identifies the virtual processor 32 on which the critical region 50 is executing.

In one embodiment, each critical region indicator 56 forms a counter that is incremented when a corresponding execution context 34 enters each critical region 50 and is decremented when the corresponding execution context 34 exits each critical region 50. In other embodiments, each critical region indicator 56 forms another suitable indicator that identifies when a corresponding execution context 34 is executing a critical region 50 or is blocked during execution of a critical region 50.

Figure 2B:
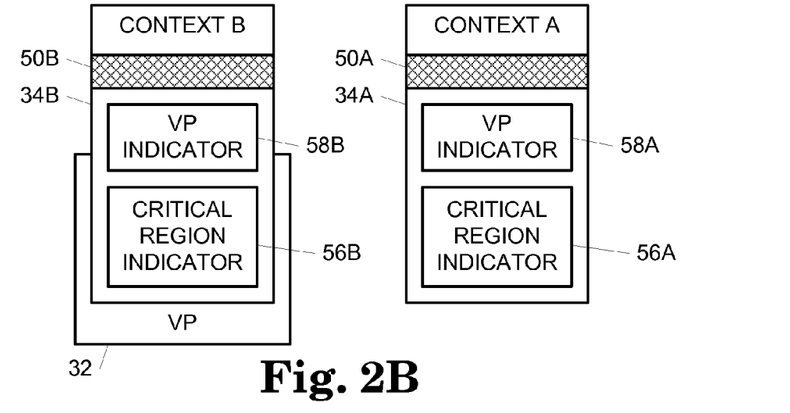
Figure 2C:
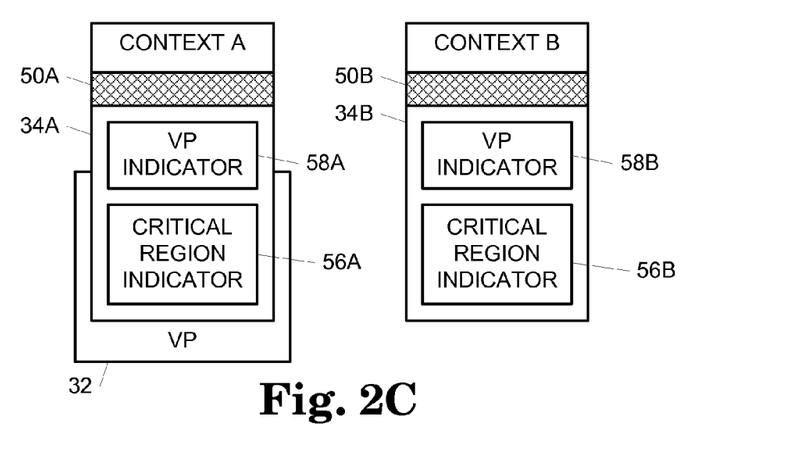
Figure 3:
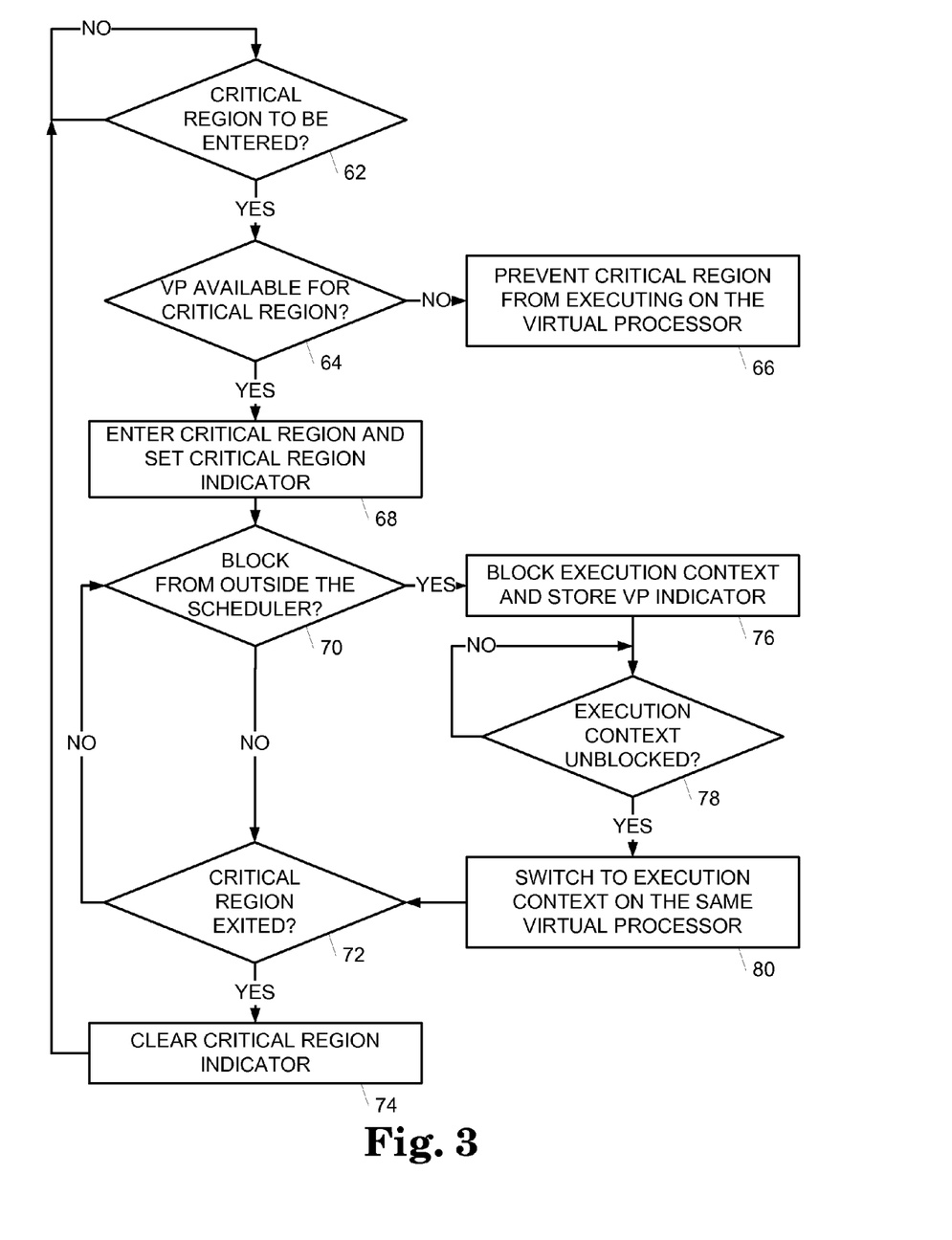
FIG. 3 is a flow chart illustrating an embodiment of a method for executing an execution context with a critical region.

Scheduler 22 identifies each execution context 34 that blocked in a critical region 50 using a corresponding critical region indicator 56 and a corresponding virtual processor indicator 58 as illustrated by the method of FIG. 3. FIG. 3 is a flow chart illustrating an embodiment of a method for executing an execution context 34 with a critical region 50. The method of FIG. 3 will be described with reference to FIGS. 2A-2C which are block diagrams illustrating embodiments of a processing resource, i.e., virtual processor 32, that executes execution contexts 34A and 34B.

In FIG. 3, a determination is made as to whether critical region 50A of execution context 34A is to be entered as indicated in a block 62. The determination may be made explicitly in response to executing construct 52A in one embodiment or implicitly in other embodiments. Critical region 50A may, for example, include code that allows virtual processor 32 to make a scheduling decision as to which execution context 38 or task 42 to execute next.

When an entry to critical region 50A is detected, a determination is made as to whether the virtual processor 32 that is executing the execution context 34A is available to execute the critical region 50A as indicated in a block 64. Scheduler 22 prevents the execution context 34A from entering critical region 50A if another execution context 34 or 38 is currently blocked and the execution context 34 or 38 blocked in a critical region 50 while executing on the same virtual processor 32 that is executing execution context 34A. In such a scenario, the virtual processor 32 is not available to execute critical region 50A of execution context 34A and scheduler 22 prevents critical region 50A from executing on the virtual processor 32 as indicated in a block 66. To do so, scheduler 22 may block execution context 34A prior to entering critical region 50A or may move execution context 34A to another virtual processor 32 prior to entering critical region 50A.

If no other execution context 34 or 38 is currently blocked while executing a critical region 50 on the virtual processor 32, execution context 34A enters critical region 50A and sets critical region indicator 56A as indicated in block 68. In one embodiment, execution context 34A increments critical region indicator 56A to set critical region indicator 56A. In other embodiments, execution context 34A sets critical region indicator 56A in other suitable ways.

A determination is made as to whether execution context 34A is blocked from outside of scheduler 22 prior to exiting critical region 50A as indicated blocks 70 and 72. If execution context 34A exits critical region 50A prior to being blocked, then execution context 34A clears critical region indicator 56A as indicated in a block 74. The determination that execution context 34A exited critical region 50A may be made explicitly in response to executing construct 54A in one embodiment or implicitly in other embodiments. In one embodiment, execution context 34A decrements critical region indicator 56A to clear critical region indicator 56A. In other embodiments, execution context 34A clears critical region indicator 56A in other suitable ways.

If execution context 34A is blocked from outside scheduler 22 prior to exiting critical region 50A, then execution context 34A blocks and stores a virtual processor indicator 58A that identifies the virtual processor 32 on which the critical region 50A is executing as indicated in block 76. Critical region 50A may invoke a page fault, for example, which causes the OS to block critical region 50A so that the page fault can be serviced. Execution context 34A remains in the blocked state until the entity that causes the block provides a signal to scheduler 22 that indicates that execution context 34A has become unblocked as indicated in a block 78.

When execution context 34A becomes unblocked, scheduler 22 examines critical region indicator 56A to detects that execution context 34A was blocked while in critical region 50A. Scheduler 22 also examines virtual processor indicator 58A to identify the virtual processor 32 that was executing critical region 50A when execution context 34A was blocked. Scheduler 22 causes the virtual processor 32 to switch to execution context 34A to continue executing critical region 50A as indicated in a block 80. When the virtual processor 32 becomes available, scheduler 22 may switch to the unblocked execution context 34A before switching to other execution contexts 38 or tasks 42.

Subsequent to execution context 34A blocking and prior to resuming execution context 34A on the virtual processor 32, scheduler 22 may cause virtual processor 32 to switch to an execution context 34B as shown in FIG. 2B and perform the method of FIG. 3 separately for execution context 34B. In FIG. 2B, virtual processor 32 is executing execution context 34B while execution context 34A is blocked. If execution context 34B executes to completion without attempting to enter a critical region 50B, then virtual processor 32 may switch to and execute other execution contexts prior to resuming execution context 34A. If, however, execution context 34B attempts to enter a critical region 50B, scheduler 22 prevents critical region 50B from executing on the virtual processor 32, as described above in blocks 64 and 66, because execution context 34A blocked on the same virtual processor 32 in critical region 50A. Scheduler 22 may block execution context 34B prior to entering critical region 50B or may move execution context 34B to another virtual processor 32 prior to entering critical region 50B.

Once the execution of critical region 50A of execution context 34A is resumed, execution context 34A maintains the state of critical region indicator 56A until critical region 50A is exited. In FIG. 2C, virtual processor 32 resumes the execution of critical region 50A. Execution context 34B is shown as blocked in FIG. 2C where the blocking may have occurred because execution context 34B attempted to enter critical region 50B. Upon exit of critical region 50A, execution context 34A clears critical region indicator 56A as indicated in block 74.

With the method of FIG. 3, scheduler 22 allows execution context 34A to be resumed subsequent to being preempted by an entity other than scheduler 22 and without providing any knowledge of the preemption to execution context 34A.

In embodiments of runtime environment 10 that include garbage collection, scheduler 22 may operate to suspend execution contexts 34 and 38 at a safe point in response to garbage collection being invoked. To get each execution context 34 and 38 to a safe point, scheduler 22 round robins through execution contexts 34 or 38 to allow each execution context 34 and 38 to reach a safe point. As shown in the embodiment of FIG. 3, any execution context 34 or 38 that attempts to enter a critical region 50 while trying to reach a safe point ensures that the virtual processor 32 that is executing the execution context 34 or 38 is available to enter the critical region 50. If not, then the execution context 34 or 38 cooperatively blocks prior to entering the critical region 50 to reach the safe point.

The above embodiments may allow a cooperative scheduler to operate in a runtime environment where preemptive blocking of an execution of an execution context of the scheduler can occur without knowledge of the scheduler. When such blocking occurs in a critical region of the execution context, the scheduler invokes mechanisms that ensure the desired execution of the execution context when the execution context is unblocked. In addition, the execution contexts may be structured to operate with a cooperative scheduler without regard for the possibility of preemptive blocking.

In one embodiment, process 12 (shown in FIG. 1) organizes tasks into one or more schedule groups 90 and presents schedule groups 90 to scheduler 22 as shown in FIG. 4. FIG. 4 is a block diagram illustrating an embodiment of a schedule group 90 for use in scheduler 22.

Schedule group 90 includes a runnables collection 92, a realized task collection 93, a work collection 94, and a set of zero or more workstealing queues 96. Runnables collection 92 contains a list of unblocked execution contexts 38. Scheduler 22 adds an execution context 38 to runnables collection 92 when an execution context becomes unblocked. Realized task collection 93 contains a list of realized tasks 40 (e.g., unstarted agents) that may or may not have associated execution contexts 38. Scheduler 22 adds a realized task to realized task collection 93 when a new runnable task is presented to scheduler 22 by process 12. Work collection 94 contains a list of workstealing queues 96 as indicated by an arrow 98 and tracks the execution contexts 34 that are executing tasks from the workstealing queues 96. Each workstealing queue 96 includes one or more unrealized tasks 42.

Using the embodiment of FIG. 4, scheduler 22 may first search for unblocked execution contexts 38 in the runnables collection 92 of each schedule group 90 in scheduler 22. Scheduler 22 may then search for realized tasks in the realized task collection 93 of all schedule groups 90 in scheduler 22 before searching for unrealized tasks in the workstealing queues 96 of the schedule groups 90.

In one embodiment, a virtual processor 32 that becomes available may attempt to locate a runnable execution context 38 in the runnables collection 92 in the schedule group 90 from which the available virtual processor 32 most recently obtained a runnable execution context 38 (i.e., the current schedule group 90). The available virtual processor 32 may then attempt to locate a runnable execution context 38 in the runnables collections 92 in the remaining schedule groups 90 of scheduler 22 in a round-robin or other suitable order. If no runnable execution context 38 is found, then the available virtual processor 32 may then attempt to locate an unrealized task 42 in the workstealing queues 96 of the current schedule group 90 before searching the workstealing queues 96 in the remaining schedule groups 90 of scheduler 22 in a round-robin or other suitable order.

Figure 5:
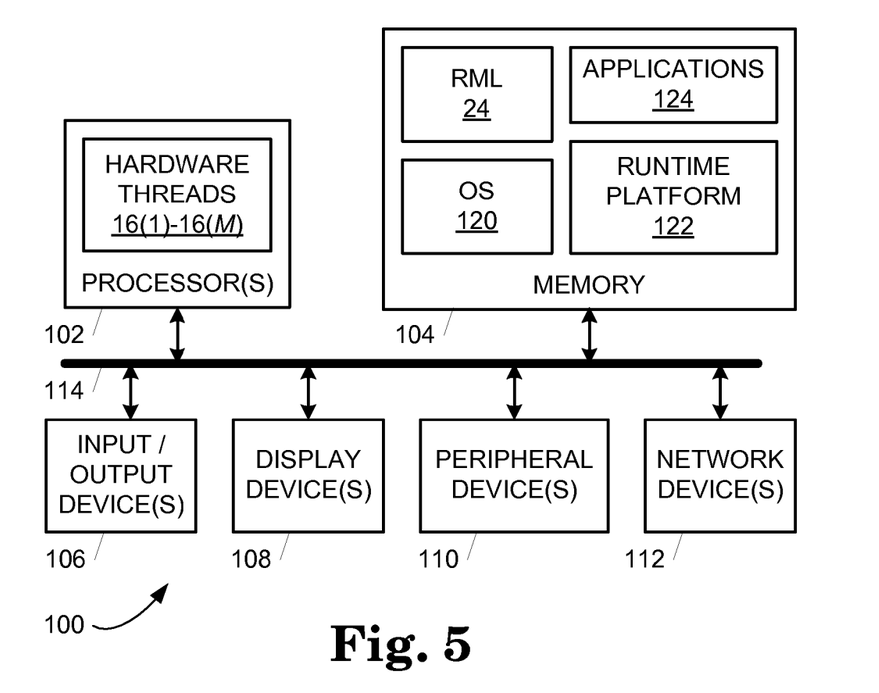
FIG. 5 is a block diagram illustrating an embodiment of a computer system configured to implement a runtime environment including a scheduler configured to schedule execution contexts for execution by processing resources.

FIG. 5 is a block diagram illustrating an embodiment of computer system 100 which is configured to implement runtime environment 10 including scheduler 22 where scheduler 22 is configured to schedule execution contexts for execution by processing resources as described above.

Computer system 100 includes one or more processor packages 102, a memory system 104, zero or more input/output devices 106, zero or more display devices 108, zero or more peripheral devices 110, and zero or more network devices 112. Processor packages 102, memory system 104, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone, and an audio/video device. The components of computer system 100 (i.e., processor packages 102, memory system 104, input/output devices 106, display devices 108, peripheral devices 110, network devices 112, and interconnections 114) may be contained in a common housing (not shown) or in any suitable number of separate housings (not shown).

Processor packages 102 include hardware threads 16(1)-16(M). Each hardware thread 16 in processor packages 102 is configured to access and execute instructions stored in memory system 104. The instructions may include a basic input output system (BIOS) or firmware (not shown), OS 120, a runtime platform 122, applications 124, and resource management layer 14 (also shown in FIG. 1). Each hardware thread 16 may execute the instructions in conjunction with or in response to information received from input/output devices 106, display devices 108, peripheral devices 110, and/or network devices 112.

Computer system 100 boots and executes OS 120. OS 120 includes instructions executable by hardware threads 16 to manage the components of computer system 100 and provide a set of functions that allow applications 124 to access and use the components. In one embodiment, OS 120 is the Windows operating system. In other embodiments, OS 120 is another operating system suitable for use with computer system 100.

Resource management layer 14 includes instructions that are executable in conjunction with OS 120 to allocate resources of computer system 100 including hardware threads 16 as described above with reference to FIG. 1. Resource management layer 14 may be included in computer system 100 as a library of functions available to one or more applications 124 or as an integrated part of OS 120.

Runtime platform 122 includes instructions that are executable in conjunction with OS 120 and resource management layer 14 to generate runtime environment 10 and provide runtime functions to applications 124. These runtime functions include a scheduler function as described in additional detail above with reference to FIG. 1. The runtime functions may be included in computer system 100 as part of an application 124, as a library of functions available to one or more applications 124, or as an integrated part of OS 120 and or resource management layer 14.

Each application 124 includes instructions that are executable in conjunction with OS 120, resource management layer 14, and/or runtime platform 122 to cause desired operations to be performed by computer system 100. Each application 124 represents one or more processes, such as process 12 as described above, that may execute with scheduler 22 as provided by runtime platform 122.

Memory system 104 includes any suitable type, number, and configuration of volatile or non-volatile storage devices configured to store instructions and data. The storage devices of memory system 104 represent computer readable storage media that store computer-executable instructions including OS 120, resource management layer 14, runtime platform 122, and applications 124. The instructions are executable by computer system to perform the functions and methods of OS 120, resource management layer 14, runtime platform 122, and applications 124 described herein. Examples of storage devices in memory system 104 include hard disk drives, random access memory (RAM), read only memory (ROM), flash memory drives and cards, and magnetic and optical disks.

Memory system 104 stores instructions and data received from processor packages 102, input/output devices 106, display devices 108, peripheral devices 110, and network devices 112. Memory system 104 provides stored instructions and data to processor packages 102, input/output devices 106, display devices 108, peripheral devices 110, and network devices 112.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a scheduler of a process executing on a computer system, the method comprising:
   detecting that a first execution context preempted and blocked by an entity other than the scheduler in a first critical region while executing on a processing resource of the scheduler, the first critical region is a set of instructions in the first execution context whose execution becomes contingent on data corresponding to the processing resource; and
   ensuring that the first execution context resumes execution on the processing resource in response to an indication to the scheduler from the entity that caused the block indicating the first execution context becoming unblocked and without the scheduler providing any knowledge of the preemption to the first execution context.

2. The method of claim 1 further comprising:
   preventing a second execution context from entering a second critical region on the processing resource subsequent to the first execution context blocking and prior to resuming execution of the first execution context, the second critical region is a set of instructions in the second execution context whose execution becomes contingent on data corresponding to the processing resource.

3. The method of claim 1 further comprising:
   setting a critical region indicator corresponding to the first execution context in response to the first execution context entering the first critical region.

4. The method of claim 3 wherein the first execution context blocks in response to a block from outside of the scheduler.

5. The method of claim 4 further comprising:
   clearing the critical region indicator in response to the first execution context exiting the first critical region subsequent to resuming the first execution context.

6. The method of claim 1 further comprising:
   storing an indicator that identifies the processing resource in response to the first execution context blocking in the first critical region.

7. The method of claim 1 further comprising:
   providing a signal to the scheduler in response to the first execution context becoming unblocked.

8. The method of claim 1 wherein the first critical region executes to select a second execution context for execution on the processing resource.

9. The method of claim 1 wherein the processing resource includes a virtual processor that maps to a hardware thread.

10. A computer readable storage medium storing computer-executable instructions that, when executed by a computer system, perform a method comprising:
    entering a critical region of a first execution context executing on a first processing resource of a scheduler in a process of the computer system, the critical region is a set of instructions in the first execution context whose execution becomes contingent on data corresponding to the first processing resource;
    setting a first indicator corresponding to the first execution context in response to entering the critical region;
    blocking in response to a preemption and block by an entity other than the scheduler subsequent to setting the first indicator; and
    ensuring that the first execution context resumes execution on the first processing resource in response to an indication to the scheduler from the entity that caused the block indicating the first execution context has become unblocked and without the scheduler providing any knowledge of the preemption to the first execution context.

11. The computer readable storage medium of claim 10, the method further comprising:
    storing a second indicator that identifies the first processing resource in response to blocking.

12. The computer readable storage medium of claim 11, the method further comprising:
    exiting the critical region of the first execution context subsequent to resuming execution of the first execution context on the first processing resource; and
    clearing the first indicator in response to exiting the critical region.

13. The computer readable storage medium of claim 12, the method further comprising:
    setting the first indicator by incrementing the first indicator; and
    clearing the first indicator by decrementing the first indicator.

14. The computer readable storage medium of claim 10, the method further comprising:
    blocking in response to the first processing resource not being available to enter the critical region prior to entering the critical region.

15. The computer readable storage medium of claim 10, the method further comprising:
    moving to a second processing resource in response to the first processing resource not being available to enter the critical region.

16. A method performed by a scheduler of a process executing on a computer system, the method comprising:
    identifying a first execution context that preempted and blocked by an entity other than the scheduler in a first critical region while executing on a processing resource of the scheduler, the first critical region is a set of instructions in the first execution context whose execution becomes contingent on data corresponding to the processing resource; and
    resuming execution of the first execution context on the processing resource in response to an indication to the scheduler from the entity that caused the block indicating the first execution context has become unblocked and without the scheduler providing any knowledge of the preemption to the first execution context and prior to allowing a second critical region of a second execution context to execute on the processing resource, the second critical region is a set of instructions in the second execution context whose execution becomes contingent on data corresponding to the processing resource.

17. The method of claim 16 wherein the first critical region holds a lock.

18. The method of claim 16 wherein the first execution context blocks in response to a page fault.

19. The method of claim 16 further comprising:
    preventing the execution context from entering the second critical region on the processing resource subsequent to the first execution context blocking and prior to resuming execution of the first execution context.

20. The method of claim 16 wherein the processing resource includes a virtual processor that maps to a hardware thread.

\* \* \* \* \*